United States Patent [19]

Ferrigan

[11] 4,220,368
[45] Sep. 2, 1980

[54] REMOVABLE PLASTIC ROOF PANEL

[75] Inventor: Paul J. Ferrigan, Bolton Landing, N.Y.

[73] Assignee: Saratoga Sunroof Corporation, Clifton Park, N.Y.

[21] Appl. No.: 909,508

[22] Filed: May 25, 1978

[51] Int. Cl.² .............................................. B60J 7/00
[52] U.S. Cl. ..................................... 296/215; 49/465; 296/218; 296/224
[58] Field of Search ....................... 296/137 B, 137 H; 49/465

[56] References Cited
U.S. PATENT DOCUMENTS

| | | | |
|---|---|---|---|
| 3,610,681 | 10/1971 | Trenkler | 49/465 X |
| 3,972,558 | 8/1976 | Horn | 296/137 B |
| 4,113,303 | 9/1978 | Yench | 296/137 B |
| 4,115,955 | 9/1978 | Aldrich | 296/137 B X |

Primary Examiner—John J. Love
Assistant Examiner—Norman L. Stack
Attorney, Agent, or Firm—McCormick, Paulding & Huber

[57] ABSTRACT

A transparent plastic panel to replace the conventional metal roof panel removably received by attachment latches in the sun roof opening of a motor vehicle is held in place by fore and aft over center latches designed to mate with the sockets provided by the auto manufacturer for lever operated means on his metal roof panel. In addition to the fore and aft attachment latches on the plastic roof panel a metal edge trim is provided peripherally of the plastic panel, and a seal is mounted to this edge trim.

4 Claims, 4 Drawing Figures

U.S. Patent    Sep. 2, 1980    4,220,368
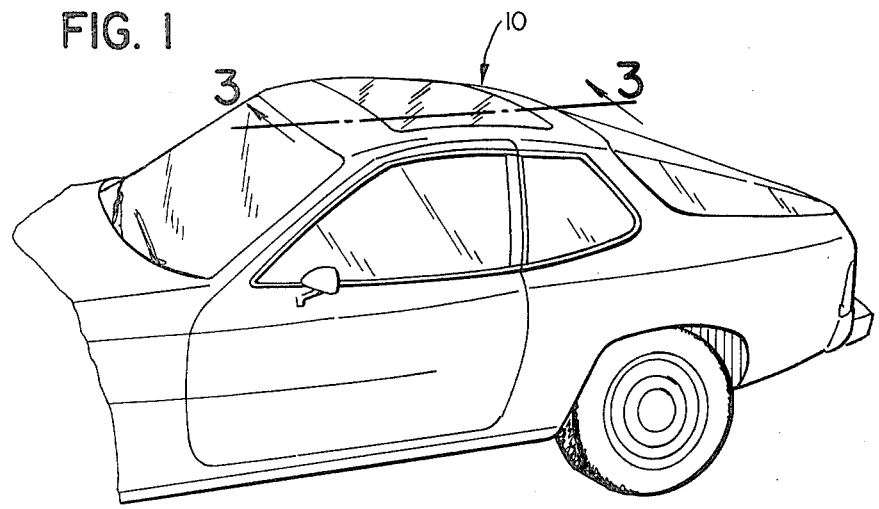
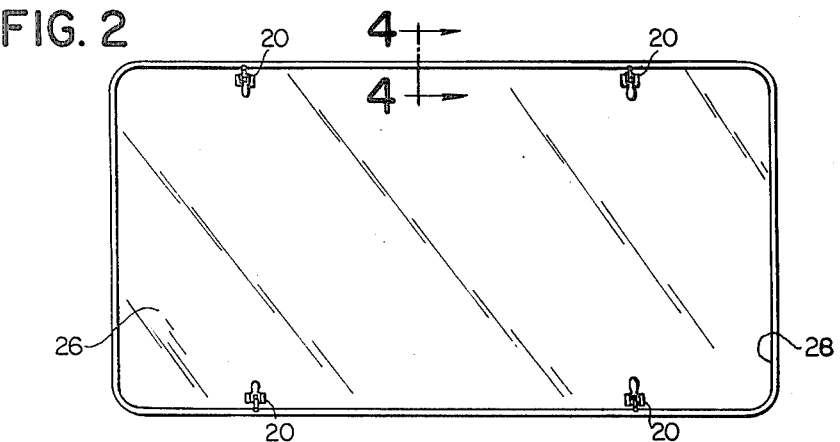
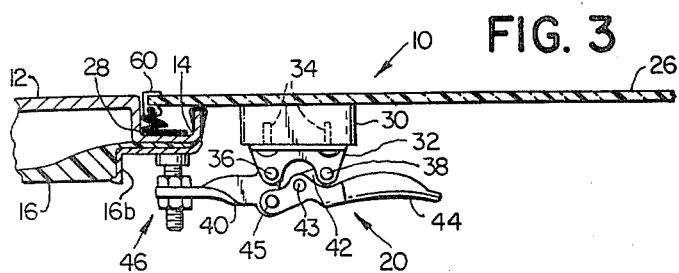
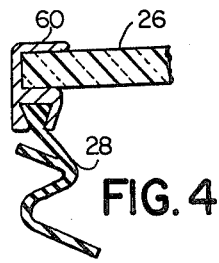

REMOVABLE PLASTIC ROOF PANEL

SUMMARY OF INVENTON

This invention relates generally to removable plastic roof panels for motor vehicles, and deals more particularly with a relatively thin acrylic or polycarbonate plastic panel to replace the relatively rigid metal panel normally provided by the vehicle manufacturer for a rectangular sun roof opening in the vehicle.

The chief aim of the present invention is to provide a readily removable transparent plastic roof panel, with fittings which do not require design changes to, or the permanent attachment of, socket defining means to the vehicle's sun roof opening, the rain trench, or the vehicle headliner.

In motor vehicles equipped with a removable rigid metal roof panel, of the type which is adapted to be replaced by a plastic transparent roof panel, the stamped metal roof of the vehicle is so formed around the sun roof opening as to define a rain trough or trench. The vehicle headliner, that is the ceiling upholstery inside the vehicle, is generally formed of plastic to fit snugly to the underside of this rain trench. The headliner is designed by the manufacturer to define sockets for receiving the conventional fore and aft attachment means provided for this purpose on the conventional rigid metal roof panel. The plastic roof panel of the present invention also has fore and aft attachment means which mate with these sockets defined in the headliner, and in addition, are adjustable to hold the relatively flexible and resilient plastic roof panel in place.

BRIEF DESCRIPTION OF THE DRAWINGS

FIG. 1 is a perspective view showing the relevant portion of a motor vehicle of the type having a removable rigid factory installed roof panel, and more particularly FIG. 1 shows a Porsche 924 with a sun roof opening of the type adapted to be fitted with an improved transparent plastic roof panel of the present invention.

FIG. 2 is a bottom view of the plastic roof panel illustrating in the fore and aft attachment means.

FIG. 3 is a sectional view taken on the line 3—3 of FIG. 1 and illustrating the fore attachment means.

FIG. 4 is a sectional view taken generally on the line 4—4 of FIG. 2, but drawn to a larger scale.

DETAILED DESCRIPTION

Turning now to the drawing in greater detail, FIG. 1 shows a motor vehicle of the type generally provided with a sun roof opening 10, the vehicle illustrated being a Porsche 924 of the type imported into the United States by Volkswagon of Germany. The particular type of vehicle is shown for purposes of illustration only, but it is a feature of the present invention that the factory supplied rigid metal roof panel is adapted to be replaced by a transparent plastic panel which not only serves as a window, but which is lighter in weight and more resilient than the relatively rigid metal roof panel supplied by the manufacturer.

FIG. 3 illustrates the sun roof opening 10 mentioned previously, the metal roof 12 of the vehicle being illustrated in FIG. 3 in vertical section. As shown in this view the metal roof 12 includes a peripherally extending rain trough or trench 14 formed integrally in the roof 12, and defining a generally upwardly open U-shaped well to receive a seal or the like, such seal being typically provided in the rigid metal roof panel supplied by the automobile manufacturer (not shown).

Still with reference to the conventional portion of the vehicle as provided by the automobile manufacturer, FIG. 3 illustrates, at 16b, socket defining recesses adapted to receive attachment means (not shown) associated with the conventional rigid metal roof panel (not shown) provided by the automobile manufacturer.

Turning now to a more detailed description of the plastic roof panel illustrated in FIG. 2, the panel itself comprises a relatively thin transparent plastic material, such as acrylic or polycarbonate or the equivalent, to provide the optical qualities desired in a sun roof type window. The panel 26 is of constant thickness as best shwn in FIG. 3 throughout its expanse and preferably includes an elastomeric seal member 28 extending peripherally around the roof panel as best shown in FIG. 2. The seal 28 is adapted to be received in the upwardly open rain trench 14. This seal is preferably secured to a metal edge trim at the periphery of the plastic roof panel 26 as best shown in FIG. 4.

The fore and aft attachment means 20 are illustrated in some detail in FIG. 3. The attachment means 20 comprises a depending plastic post 30 cemented to the underside of the plastic roof panel 26. An over center latch includes a bracket 32 secured to the post 30 by screws 34, 34. The bracket 32 receives a pair of pivot pins 36 and 38 for an arm 40 and link 42. One of the ends of the link 42 is pivoted at 38, and the other end of the link is pivoted at 43 to a lever 44. The lever 44 is also pivotally mounted at 45, to the arm 40 to provide a three bar over center latch geometry.

The arm 40 has a free end which includes an adjustable stop means 46 for engaging the recess 16b. In the latched position the attachment means 20 is provided with pivot 43 above a line between the pivots 45 and 38.

Finally, I also provide a metal edge trim 60 peripherally of the plastic panel. A C-shaped upper channel receives the plastic panel, and this trim 60 is of extruded aluminum to also have a downwardly open channel for receiving the elastomeric seal 28 as best shown in FIG. 4.

I claim:

1. A removable light weight plastic panel for the roof of a motor vehicle, which vehicle has a roof with a generally rectangular opening for receiving a rigid roof panel and a formed metal rain trench extending peripherally around said rectangular roof opening, said plastic panel comprising:
    (a) a thin transparent sheet formed to substantially the same contour as the rigid roof panel, and equipped with,
    (b) identical pairs of attachment means adjacent the front and rear sides of said sheet and mounted on the inside surface of said transparent sheet and adapted for engagement with the recesses provided in the headliner of the vehicle at the front and rear edges respectively of the opening for securing the rigid roof panel, and said recesses receiving said attachment means to hold said transparent sheet,
    (c) a metal edge trim on the periphery of said plastic sheet, said trim having a C-shaped cross section to receive said plastic sheet, and
    (d) a seal extending peripherally around said plastic sheet, said peripherally extending metal edge trim having an inwardly open slot for receiving a rib on said seal to support said seal so that its free depending portion fits into the metal rain trench in the vehicle.

2. The combination defined by claim 1 wherein said attachment means comprises a depending post secured to the inside surface of said plastic panel, a over center latch secured to said post, said latch having a arm for engagement with said recesses provided in the headliner of the vehicle.

3. The combination defined by claim 2 wherein said arm of the over center latch having means for adjusting the engagement of the said arm with the said recesses provided in the headliner of the vehicle.

4. The combination defined by claim 1 wherein said transparent plastic removable roof panel is fabricated from a thermoplastic material such as acrylic or polycarbonate, and said seal is fabricated from an elastomeric material.

* * * * *